July 26, 1960

J. L. LEESON, JR 2,946,418

ELECTRICAL CONTROL OF TORQUE TRANSMITTING MECHANISM

Filed Sept. 20, 1957

INVENTOR
James L. Leeson Jr.
by Carlson, Pitzner, Hubbard & Wolfe
ATTORNEYS

July 26, 1960   J. L. LEESON, JR   2,946,418
ELECTRICAL CONTROL OF TORQUE TRANSMITTING MECHANISM
Filed Sept. 20, 1957   3 Sheets-Sheet 2
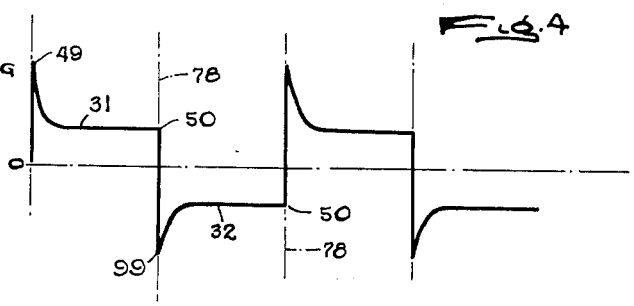
Fig. 4 — OUTPUT OF DIFFERENTIATING NETWORK 30, VOLTS
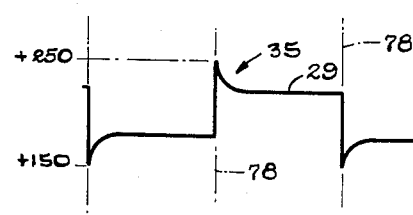
Fig. 5 — VOLTAGE OF INVERTER PLATE 51, VOLTS
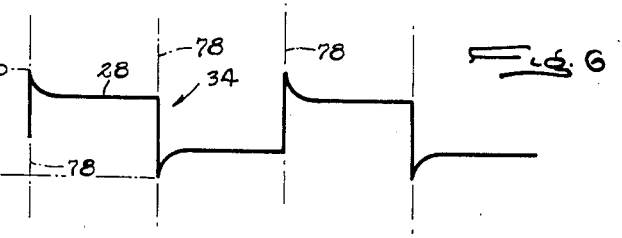
Fig. 6 — VOLTAGE AT JUNCTION 59 OF INVERTER RESISTORS 55 AND 56, VOLTS
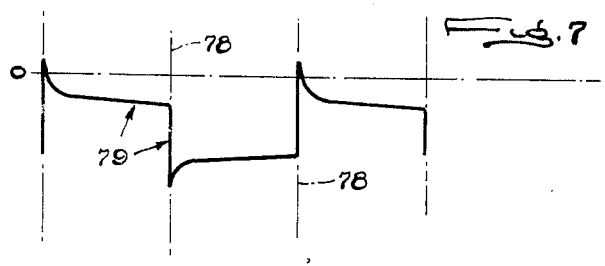
Fig. 7 — VOLTAGE OF GRID 67 OF CLUTCH TUBE 36, VOLTS
INVENTOR
James L. Leeson Jr.
by Carlson, Pitzner, Hubbard & Wolfe
ATTORNEYS July 26, 1960     J. L. LEESON, JR     2,946,418
ELECTRICAL CONTROL OF TORQUE TRANSMITTING MECHANISM
Filed Sept. 20, 1957     3 Sheets-Sheet 3
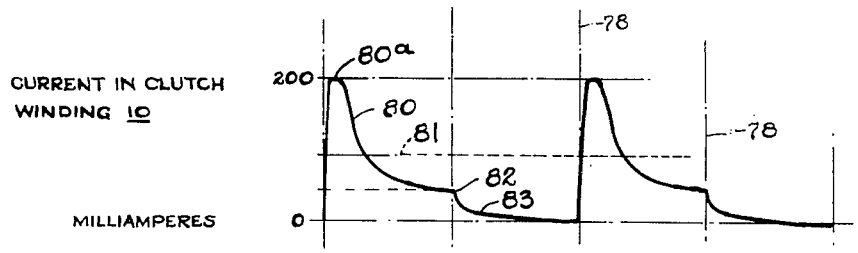
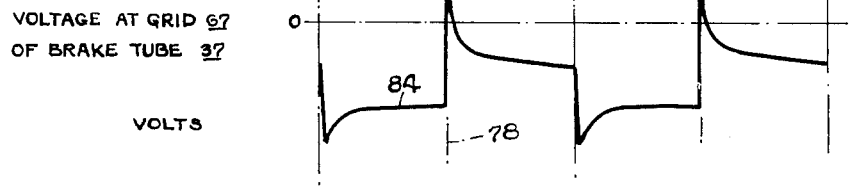
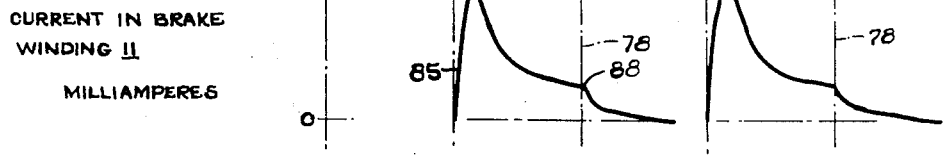
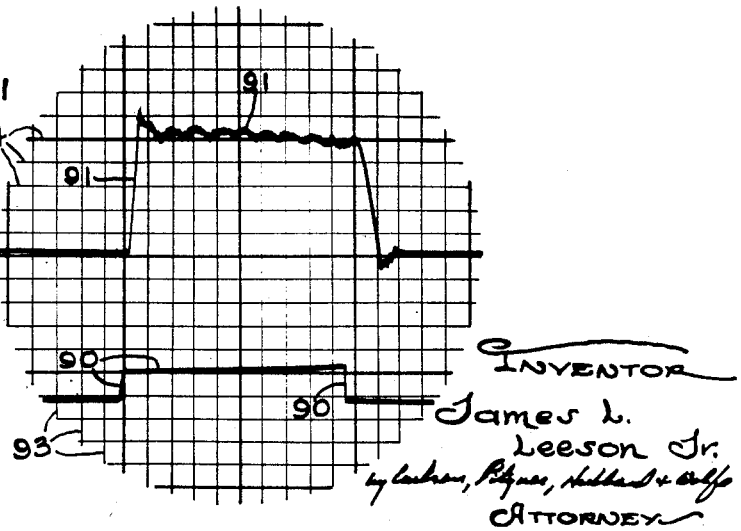
INVENTOR
James L. Leeson Jr.
ATTORNEY

United States Patent Office 2,946,418
Patented July 26, 1960

2,946,418

ELECTRICAL CONTROL OF TORQUE TRANSMITTING MECHANISM

James L. Leeson, Jr., Beloit, Wis., assignor to Warner Electric Brake & Clutch Company, South Beloit, Ill., a corporation of Illinois Filed Sept. 20, 1957, Ser. No. 685,248

9 Claims. (Cl. 192—12)

This invention relates generally to an electrical system for varying the energization of two electromagnetic windings and, more particularly, to a control for energizing an electromagnetic clutch and an electromagnetic brake successively to effect quick starting and stopping of a rotary driven element.

The general object of the invention is to effect successive energization of the clutch and brake in cycles which may be repeated with extreme rapidity due to the absence of switch contacts or other movable parts having inherent time delays.

Another object is to avoid the time delays of moving parts by the provision of a novel electronic control by which the clutch and brake are energized in quick succession in response to a single control impulse of given duration.

A further object is to achieve the desired rapid and successive energization of the clutch and brake windings by dividing the control impulse into two components which are applied individually to the windings and are time spaced apart according to the length of the impulse.

A more detailed object is to shape each control component and utilize the same in a novel manner to render the clutch and brake effective in rapid succession while avoiding the simultaneous transmission of opposing torques.

Other objects and advantages of the invention will become apparent from the following detailed description taken in connection with the accompanying drawings, in which—

Figs. 3 to 10 are curves showing the variation of voltage or current at different parts of the control, all of these curves being plotted abscissas against time as represented by a common axis of abscissas.

Fig. 11 is a chart representing actual cathode ray oscilloscope traces of the control impulse and the speed of the output shaft.

Figure 1:
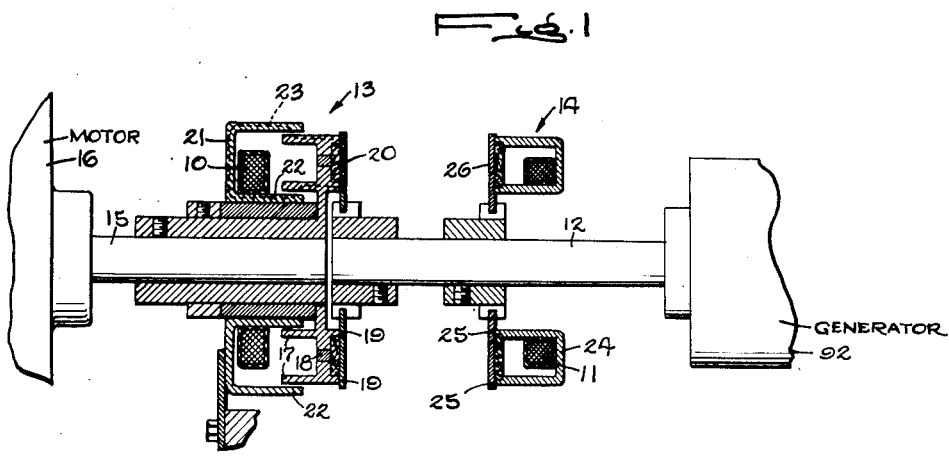
Figure 1 is a diametrical cross sectional view of a clutch and a brake adapted to be controlled in accordance with the present invention.

The present invention is especially adapted for the selective energization of two electromagnetic windings 10 and 11 which control the transmission of torque to an output member such as a rotatably supported shaft 12. In Fig. 1, the windings are shown for purposes of illustration as parts of an electromagnetic clutch 13 operable when energized to transmit a driving torque to the shaft and an electromagnetic brake 14 for applying a retarding torque to the shaft.

The clutch 13 herein is of the direct acting type having a driving element fast on a continuously rotating shaft 15 of a motor 16. This element comprises radially spaced cylindrical rings 17 of magnetic material secured rigidly together by a non-magnetic spacer 18 and providing flush axially facing pole faces 19 at one of their ends. The pole faces are spanned by and adapted for axial gripping engagement with a flat magnetic armature ring 20 which constitutes the driven clutch element and is mounted on the output shaft 12 for rotation therewith and axial movement relative thereto.

The clutch winding 10 is secured within a stationarily mounted annular core 21 of magnetic material of U-shaped cross section having radially spaced legs 22 telescoping closely with the other end portions of the pole rings 17. Upon energization of the winding, the magnetic flux resulting therefrom threads a path extending around the core, radially between the legs 22 and the pole rings and axially back and forth between the pole faces 19 and the armature as indicated by a dotted line 23 in Fig. 1. Such flux attracts the armature into gripping engagement with the pole faces thereby coupling the output shaft 12 to the motor shaft 15.

The brake 14 similarly is of the direct acting type and comprises an annular stationarily supported magnetic core 24 of U-shaped cross section enclosing the winding 11 and having radially spaced pole pieces which terminate in axially facing pole faces 25. The latter are spanned by and adapted for axial gripping engagement with a flat magnetic armature ring 26 rotatable with but shiftable axially along the output shaft 12. Upon energization of the winding, the resulting flux threads axially back and forth between the pole faces and the armature to attract the same into gripping engagement and apply a retarding torque to the output shaft.

Figure 3:
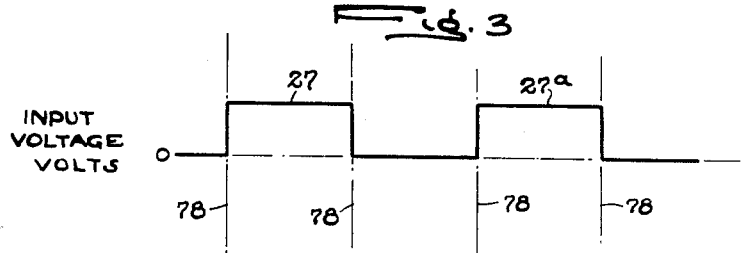

In accordance with the present invention, the clutch 13 and the brake 14 are rendered effective in quick succession for extremely rapid starting and stopping of the output shaft 12, that is, acceleration from a standstill to the speed of the motor shaft 15 followed by a complete stopping all within a few milliseconds. This is accomplished by the provision of a novel electronic control system which, in response to a single impulse 27 (Fig. 3), energizes the windings 10 and 11 in rapid succession while avoiding the necessity of switch contacts or other moving parts having time delays inherent in their operation. The control first divides the impulse into two components 28 and 29 (Figs. 6 and 5) which are spaced by a time interval equal to the duration of the impulse. The first component 28 occurs at the beginning of the impulse and is used to energize the clutch 13. The second component is used to energize the brake winding 11 at the end of the impulse. Simultaneous application of the clutch and brake is avoided by deenergizing each winding before energization of the other winding.

To obtain the successive clutch and brake components 28 and 29 from the single control impulse 27, the latter is first applied to a differentiating network 30. This network converts the impulse to an alternating signal having two half waves 31 and 32 (Fig. 4) the first of which increases in amplitude in a positive direction and then decreases in response to the initiation of the control impulse. The second half wave 32 also increases and decreases in amplitude but in a negative direction in response to termination of the impulse.

From the differentiating network 30, the alternating signal 31, 32 is applied to an amplifier and phase inverter 33. The output of the latter comprises two alternating signals 34 and 35 (Figs. 5 and 6) one in phase and the other out of phase with the signal 31, 32 from the differentiating network. The first or clutch signal component 28 is the positive half wave of the in-phase signal from the inverter and the second or brake signal component 29 is the positive half wave of the out-of-phase inverter signal 35. The first component 28 begins at the instant that the impulse 27 begins, while the second component 29 begins at the instant that the impulse 27 ends (compare Figs. 3, 5 and 6). From the inverter, the respective components are applied individually to the windings 10 and 11 through separate electronic amplifying devices 36 and 37.

Figure 2:
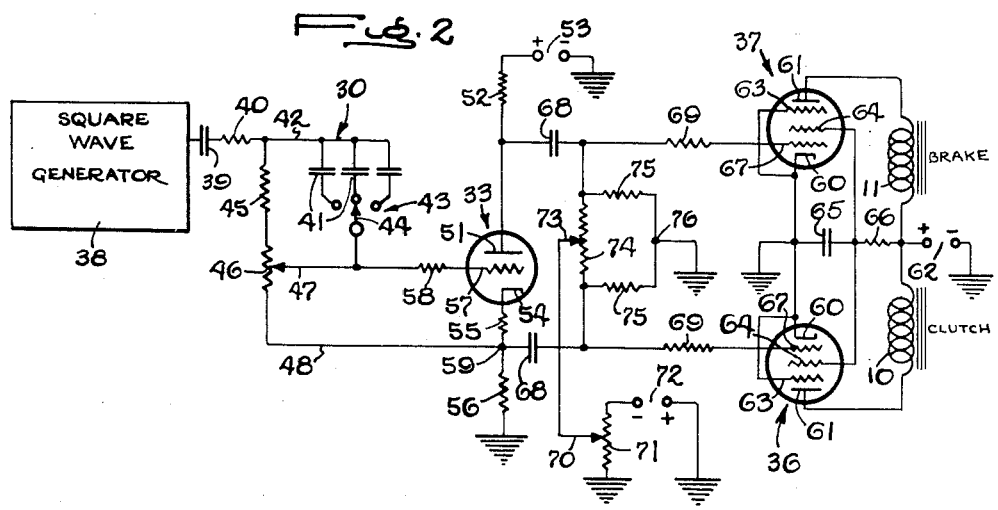
Fig. 2 is a schematic view and wiring diagram of a control embodying the novel features of the present invention.

By virtue of its extremely fast action, the improved control system is especially suited for cycling, that is, starting and stopping of the output shaft 12, in response to a succession of rapidly recurring control impulses 27. Such an input signal for the system may be supplied in various ways well known in the art, for example, by a conventional square wave generator 38 of adjustable frequency (Fig. 2). The duration and time spacing of successive impulses with such a generator depends on the selected output frequency. That is, the square wave generator 38 forms a means to measure off successive time periods since its signal changes levels during the successive periods represented by the vertical dashed lines in Fig. 3. The spacing between the pulses 27 need not be uniform, and they may in fact be generated one at a time only when some external stimulus is received. To apply the succession of impulses to the differentiating network 30, the latter is connected to the generator through a suitable coupling capacitor 39 and a resistor 40 in series with each other.

The differentiating network 30 in this instance comprises a variable resistance and a variable capacitance in parallel. To provide the variable capacitance, corresponding plates of each of three capacitors 41 are connected by a common conductor 42 to the coupling resistor 40 and the other plates are connected to individual fixed contacts of a selector switch 43. These contacts are engageable separately by an adjustable contact 44. The variable resistance is made up of a fixed resistor 45 having one terminal connected to the common capacitor conductor 42 and its other terminal connected to one end of a variable resistor 46. The slider 47 of the latter is connected directly to the adjustable selector switch contact. The output signal 31, 32 of the network then appears as the voltage between the slider 47 and a conductor 48 connected to the other terminal of the variable resistor 46 remote from the fixed resistor 45.

With the paralleled resistance and capacitance elements 41, 45 and 46, a wave-shaping action occurs and the magnitude of each of the half waves 31 and 32 of the output signal of the differentiating network initially increases abruptly to a sharp peak 49 (Fig. 4) and then decreases gradually or exponentially. The value to which each half wave decreases before the next half wave depends on the selected values of the resistance and capacitance elements. For a purpose to appear later, it is desirable that each half wave decrease exponentially to a value 50 substantially above zero and then finally drop quickly to zero at the end of the half wave as shown in Fig. 4.

The phase inverter 33 comprises a vacuum triode having its plate 51 connected through a resistor 52 to the positive terminal of a suitable source 53 of direct current. To complete the plate circuit, the cathode 54 is connected to the negative terminal of the source through two series resistors 55 and 56 and ground. The output signal of the differentiating network is applied to the inverter by connecting the slider 47 of the adjustable resistor 46 to the grid 57 of the triode through a series resistor 58 and connecting the output conductor 48 of the network to the junction 59 between the cathode resistors. The potential at this junction is in phase with the output signal of the network and provides the clutch component 28. The brake component 29 is obtained from the plate 51 of the triode.

While transistors may be utilized as the electronic control devices 36 and 37 for amplifying the individual control components 28 and 29 and applying the same to the respective windings 10 and 11, vacuum pentodes are employed in this instance. The cathodes 60 of these tubes are connected together and to ground and the plates 61 are connected individually through the different windings to the positive terminal of another source 62 of direct current. To complete the respective plate circuits, the negative terminal of this source is connected to the cathodes through ground. The suppressor grids 63 of the tubes are connected directly to the cathodes and the screen grids 64 are connected to the cathodes through a capacitor 65 and to the positive terminal of the source through a resistor 66.

The different components 28 and 29 are transmitted from the plate 51 of the inverter 33 and the junction 59 of the cathode resistors 55 and 56 to the respective control grids 67 of the pentodes 36 and 37 through coupling capacitors 68 and individual resistors 69 connected in series with the grids. Normally when there are no signals from the inverter, the pentodes are rendered nonconductive so that current through the windings 10 and 11 is substantially cut-off by biasing the control grids negatively with respect to the cathodes 60. For this purpose, an adjustable tap 70 of a resistor 71 in series with another direct current source 72 is connected to an adjustable tap 73 of another resistor 74 connected between the ends of the grid resistors 69 remote from the grids and across two resistors 75 having a common grounded junction 76.

In an electromagnet of the type disclosed herein, the build-up and decay of flux in the magnetic elements tend to lag behind the completion and interruption of the energizing circuit for the magnet winding. These time delays are due to hysteresis and eddy current effects in the magnetic elements and may be reduced without damage to the magnet by energizing the winding at a voltage equal to several times the rated voltage for a short period. Such overexcitation is effected in the present system by taking advantage of the shape of the different components 28 and 29 and correlating the amplitude of the components with the values of the voltages applied to the grids 67 and plates 61 of the pentodes 36 and 37. Thus, the voltage supplied by the plate source 62 is equal to several times the rated voltage of each of the windings 10 and 11 and the bias on each grid is adjusted so that, when the peak of the associated component is superimposed on it, substantially all of the plate voltage is applied across the winding. Then, as the amplitude of the component decreases from the peak, the voltage across the winding decreases quickly to a value below the rated voltage.

By proper shaping, the clutch and brake components 28 and 29 also are utilized to reduce the flux in the magnetic elements of the clutch 13 and the brake 14 to as low a value as possible to avoid the simultaneous transmission of torque by both friction devices while still insuring that the clutch elements do not slip relative to each other before the end of the control impulse 27 and that the brake brings the output shaft quickly to a complete stop. It is for this purpose that the differentiating network elements are adjusted so that the amplitude of each of the half waves 31 and 32 decreases exponentially to the value 50 above zero before dropping abruptly to zero at the end of the half wave. The value of voltage applied to the clutch and brake windings 10 and 11 and corresponding to these values of the half waves are below the rated voltage but above zero.

In connection with the following discussion of the operation of the improved control system, it is noted that all of the curves in Figs. 3 to 10 are plotted with the same time base as represented by the alined vertical lines 78 in these figures. In the operation, let it be assumed that there has been no input signal from the square wave generator 38 and that the pentodes 36 and 37 are biased to cut-off. Both the clutch winding 10 and the brake winding 11 then are deenergized and the output shaft 12 is stationary.

Upon initiation of the first control impulse 27 (Fig. 3), the output voltage of the differentiating network 30 as represented by the curve 31, 32 (Fig. 4) rises abruptly to the peak 49. This voltage then decreases exponentially to its value 50 above zero and, at the end of the impulse, drops quickly to zero. The positive half wave 31 thus produced is amplified by the phase inverter 33 to form the clutch component 28 (Fig. 6) which is applied to the control grid 67 of the clutch pentode 36 to overcome the negative bias and render the tube conductive. The resultant voltage on this grid as represented by a curve 79 (Fig. 7) increases abruptly to a peak slightly above zero and then decreases exponentially to a value below zero but above the cut-off value before dropping abruptly to the latter at the end of the half wave.

As the potential on the grid 67 of the clutch pentode 36 initially rises above zero, substantially the full voltage of the plate supply 62 is applied across the clutch winding 10. This produces a substantially immediate rise of the current in the winding along a curve 80 (Fig. 8) from zero to a peak value 80a around twice the rated value of current for the winding, such rated value being indicated by a line 81 (Fig. 8). A corresponding rise of the flux in the path 23 through the clutch armature 20 takes place to draw the latter quickly into full gripping engagement with the pole faces 19. The output shaft 12 thereby is coupled to the motor shaft 15 and accelerates quickly to the speed of the latter.

As the voltage of the clutch grid 67 decreases beyond its peak, the clutch current similarly decreases to a value 82 below its rated value 81 but above zero before the grid voltage drops abruptly to zero at the end of the first half wave 31 of the output signal of the differentiating network 30. Such intermediate value of current is sufficient to avoid slippage of the clutch armature relative to the pole faces and herein is on the order of forty-five percent of the rated current. When the grid potential drops to zero, the clutch current then decreases exponentially to zero from the intermediate value 82 as indicated at 83 (Fig. 8). By keeping the intermediate value of current as low as possible, not only is the attractive force on the armature reduced quickly, but the back E.M.F. induced in the clutch winding also is kept low when the voltage drops to zero.

During the first half wave 31 of the output signal of the differentiating network 30 and while the clutch 13 is energized, the inverted signal from the plate 51 of the inverter 33 is added to the normal negative bias on the control grid 67 of the brake pentode 37 to maintain this grid near the cut-off potential as indicated by the curve 84 (Fig. 9). The brake winding 11 then remains substantially deenergized with its current at zero as indicated by a curve 85 (Fig. 10). At the end of the first half wave 31 however, the brake component 29 is applied to the grid to raise the potential thereof abruptly to a peak above zero as indicated at 86 (Fig. 9). This results in overexcitation of the brake winding substantially in the same manner as that of the clutch 13 during the first half wave 31.

By the time the current in the brake winding reaches its peak 87 and the resulting flux attracts the brake armature 26 into gripping engagement with the pole faces 25 to stop the output shaft 12, the current in the clutch winding has reached a low value on the curve 83 (Fig. 8) so that the simultaneous transmission of opposing torques by the clutch and the brake is substantially avoided. At the end of the brake component 29 when the potential of the grid 67 of the brake pentode 37 and thus the voltage applied to the brake winding drop abruptly to zero, the current in the winding decreases exponentially from an intermediate value 88 (Fig. 10) the same as the clutch current. Thus, the brake is released when the clutch is applied in response to the first half wave of the second control impulse 27a. During the succeeding half waves from the differentiating network upon the receipt of subsequent impulses after the first, the wave forms of the different voltages and currents repeat themselves as shown in Figs. 3 to 10.

In one control system constructed as described above and having a clutch 13 and a brake 14 each rated to operate at 90 volts and 90 milliamperes, the initial voltage applied to the clutch winding 10 at the beginning of each control impulse 27 and to the brake winding 11 at the end of the impulse was aproximately 550 volts. This resulted in a current of around 200 milliamperes at each of the peaks 80a and 87 with the intermediate current values 82 and 88 equal to approximately 40 milliamperes or forty-five percent of the rated current. The results achieved with this system are shown in Fig. 11 in which the curves 90 and 91 respectively represent actual cathode ray oscilloscope traces of a control impulse and the output voltage of a tachometer generator 92 (Fig. 1) having its rotor driven by the output shaft 12. The impulse was one of a series recurring at a frequency of approximately 20 cycles per second and each lasting around 25 milliseconds. In Figure 11, the spacing of adjacent vertical lines 93 corresponds to 2.5 milliseconds and the spacing of adjacent horizontal lines 94 for the tachometer voltage curve 91 corresponds to 360 revolutions of the output shaft 12 per minute.

Referring to Fig. 11, it will be seen that the output shaft 12 reached the full speed of the motor shaft 15, that is, 1800 revolutions per minute, within an interval of approximately 1.3 milliseconds after the initial rise of the control impulse curve 90. Deceleration of the output shaft to a full stop was effected within approximately 3.75 milliseconds after the impulse began to terminate. By increasing the frequency of the impulses, it was found possible to repeat a full cycle of accelerating the output shaft to full speed and then decelerating the shaft to a complete stop more than fifty times per second.

I claim as my invention:

1. In a torque transmitting mechanism with an electromagnetic clutch having a winding energizable for transmitting a driving torque to a driven element and an electromagnetic brake having a winding energizable for applying a retarding torque to the driven element, means for starting and stopping the driven element in response to a single input impulse of given duration which comprises a differentiating network responsive to each such impulse and operable to convert the same to a first alternating voltage signal whose second half wave follows the first at an interval equal to the duration of the impulse, the amplitude of each of said half waves initially increasing abruptly to a peak value and then decreasing exponentially to an intermediate value above zero before dropping abruptly to zero, means for amplifying said signal and applying the same to one of said windings to increase and decrease the energization of the winding during the positive half cycle of the signal, means for inverting said first signal to provide a second signal of the same shape but of opposite phase, and means for amplifying said second signal and applying it to the other of said windings to increase the energization of the other winding following the decrease of energization of said one winding, the voltage applied by each of said amplifying means to the associated winding initially increasing abruptly to a peak value equal to several times the rated voltage of the winding and then decreasing exponentially to an intermediate value below the rated voltage.

2. In apparatus successively energizing an electromagnetic clutch and an electromagnetic brake for quick starting and stopping of a rotary driven element in response to a single input control pulse of given duration, the combination of two electronic control devices each having an output circuit and a control electrode and providing a current flow in the output circuit variable with the bias applied to the control electrode, clutch and brake electromagnetic windings individually connected in the respective output circuits of said electronic devices and each rated to operate at a predetermined value of current, a differentiating network responsive to a control impulse and operable to convert such impulse to an alternating signal comprising successive half waves each having an amplitude initially increasing abruptly to a peak value and then decreasing exponentially, a phase inverter responsive to said alternating signal and connected to said electrodes to apply to one electrode a bias signal comprising successive half waves in phase with and of the same shape as said half waves of the alternating signal and to the other electrode a bias signal comprising successive half waves out of phase with but of the same shape as the alternating signal half waves whereby first one of said two electronic control devices and then the other is rendered conductive to energize said windings in succession, the current resulting in each of said windings in response to said peak amplitudes of said output signal having a value substantially higher than said predetermined rated value.

3. In apparatus successively energizing an electromagnetic clutch and an electromagnetic brake for quick starting and stopping of a rotary driven element in response to a single input control impulse of given duration, the combination of, two electronic control devices each having an output circuit and a control electrode and providing a current flow in the output circuit variable with the bias applied to the control electrode, said clutch and brake having windings individually connected in the respective output circuits of said electronic devices and each energized in response to conduction by the associated device, means normally applying a non-conductive bias to said control electrodes whereby both of said windings normally are deenergized, a differentiating network providing an alternating output signal comprising successive half waves in response to a single control impulse, individual connections to said control electrodes for applying to each electrode a conductive bias to overcome said non-conductive bias, and a phase inverter connected between said differentiating network and said bias connections and applying to one of said control electrodes an alternating bias signal in phase with said network output signal and to the other electrode an alternating bias signal out of phase with the output signal whereby said devices are rendered conductive for energization of said windings in succession.

4. Means for starting and stopping a driven element in response to a single control impulse of given duration in an apparatus with an electromagnetic clutch having a winding energizable for transmitting a driving torque to a driven element and an electromagnetic brake having a winding energizable for applying a retarding torque to the driven element, said means comprising a differentiating network responsive to an input impulse of given duration and operable to convert the same to a first alternating voltage signal whose second half wave follows the first at an interval equal to the duration of the impulse, means for amplifying said voltage signal and applying the same to one of said windings to increase and decrease the energization of the winding during the positive half cycle of the signal, means for inverting said first signal to provide a second signal of opposite phase, and means for amplifying said second signal and applying it to the other of said windings to increase the energization of the other winding following the decrease of energization of said one winding.

5. In apparatus having an electromagnetic clutch and an electromagnetic brake operatively associated with a common load, said clutch and brake each having a winding, a control for effecting actuation of said brake and clutch and comprising, in combination, means for measuring off successive time periods, means for generating a first signal component at the instant that alternate ones of said periods begin, means for generating a second signal component at the instant that the other ones of said periods begin, said two generating means including means for causing said signal components to increase and then to decrease, and means for energizing said clutch and brake coils with exciting voltages which respectively vary with said first and second signal components.

6. In apparatus having an electromagnetic clutch and an electromagnetic brake operatively associated with a common load, said clutch and brake each having a winding, a control for effecting actuation of said brake and clutch and comprising, in combination, means for generating a master signal having its beginning and its ending separated by a time period, means responsive to said master signal for producing first and second signal components which are respectively initiated at the beginning and ending of said master signal, said signal component producing means including means for making said first and second signal components rise abruptly at their instants of initiation and then smoothly decrease toward a quiescent value, and means for respectively applying first and second exciting voltages to said clutch and brake windings which respectively vary substantially as said first and second signal components.

7. The combination set forth in claim 6 further characterized in that the said brake and clutch windings have rated voltages, and further in that the last-named means includes means for making said exciting voltages initially exceed the respective rated voltages and then smoothly decrease to and below the rated voltages.

8. In apparatus having an electromagnetic clutch and an electromagnetic brake operatively associated with a common load, said clutch and brake each having a winding, a control for effecting actuation of said brake and clutch and comprising, in combination, means for generating a square wave electrical impulse, means responsive to the leading edge of said impulse for generating a first signal component which increases abruptly and then decays toward a quiescent value, means responsive to the trailing edge of said impulse for driving said first signal component to its quiescent value, means responsive to the trailing edge of said impulse for generating a second signal component which increases abruptly and then decays toward a quiescent value, and means for applying exciting voltages which vary respectively as said first and second signal components to said clutch and brake windings, respectively.

9. In apparatus having an electromagnetic clutch and an electromagnetic brake operatively associated with a common load, said clutch and brake each having a winding, a control for effecting actuation of said brake and clutch and comprising, in combination, means for generating a square wave signal, differentiating and wave-shaping means connected to receive said square-wave signal, a phase inverter connected to receive the output of said differentiating and wave-shaping means and operative to produce two output signals which vary in opposite senses about quiescent values, and means for energizing said clutch and brake coils with a voltage which varies substantially as the positive-going excursions of respective ones of said output signals from their quiescent values.

References Cited in the file of this patent

UNITED STATES PATENTS

| 2,009,833 | Bedford | July 30, 1935 |
| 2,404,011 | White | July 16, 1946 |
| 2,728,878 | Sperr | Dec. 27, 1955 |